US009065279B2

(12) United States Patent
Yagura et al.

(10) Patent No.: US 9,065,279 B2
(45) Date of Patent: Jun. 23, 2015

(54) CHARGING TIME ESTIMATION DEVICE AND CHARGING TIME ESTIMATION METHOD

(71) Applicant: MITSUBISHI JIDOSHA KOGYO KABUSHIKI KAISHA, Tokyo (JP)

(72) Inventors: Hirofumi Yagura, Okazaki (JP); Koji Sato, Okazaki (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/104,985

(22) Filed: Dec. 12, 2013

(65) Prior Publication Data

US 2014/0167774 A1 Jun. 19, 2014

(30) Foreign Application Priority Data

Dec. 14, 2012 (JP) .................................. 2012-273536

(51) Int. Cl.
*G01N 27/416* (2006.01)
*H02J 7/00* (2006.01)

(52) U.S. Cl.
CPC ........................................ *H02J 7/00* (2013.01)

(58) Field of Classification Search
CPC ..... H02J 7/0047; H02J 7/0091; H02J 7/0078; H02J 7/0031; G01R 19/16542; G01R 31/3658; G01R 31/3675; G01R 31/3679
USPC .......... 320/107, 132, 149, 150, 153; 324/426, 324/427, 431, 433
See application file for complete search history.

(56) References Cited

U.S. PATENT DOCUMENTS

| 2004/0160224 A1* | 8/2004 | Yamazaki et al. ............. 324/426 |
| 2008/0204031 A1* | 8/2008 | Iwane et al. ................... 324/430 |
| 2010/0164438 A1 | 7/2010 | Saito |

FOREIGN PATENT DOCUMENTS

| JP | 7-274408 A | 10/1995 |
| JP | H10-172616 A | 6/1998 |
| JP | 11-208024 A | 7/1999 |
| JP | H11-250939 A | 9/1999 |
| JP | 2003-244882 A | 8/2003 |
| JP | 2009-72029 A | 4/2009 |
| JP | 2012-29394 A | 2/2012 |
| JP | 2012-115004 A | 6/2012 |
| JP | 4946749 B2 | 6/2012 |
| JP | 2012-196006 A | 10/2012 |

* cited by examiner

*Primary Examiner* — Edward Tso
(74) *Attorney, Agent, or Firm* — Birch, Stewart, Kolasch & Birch, LLP (57) ABSTRACT

A charging time estimation device includes a cell temperature information acquisition unit, a cell capacity information acquisition unit, a current value information acquisition unit, a deterioration state information acquisition unit, a basic estimated value calculation unit, and a charging-required time calculation unit. The charging-required time calculation unit performs correction on a basic estimated value of a constant current charging time and a basic estimated value of a constant voltage charging time by using current value information and deterioration state information, and calculates, as a charging-required time, the sum of the basic estimated value of the constant current charging time after the correction and the basic estimated value of the constant voltage charging time after the correction.

6 Claims, 4 Drawing Sheets

CHARGING TIME ESTIMATION DEVICE AND CHARGING TIME ESTIMATION METHOD

CROSS REFERENCE TO RELATED APPLICATION

This application is based on Japanese Patent Application No. 2012-273536 filed on Dec. 14, 2012, the contents of which are incorporated herein by reference.

BACKGROUND OF THE INVENTION

1. Technical Field

The present invention relates to a charging time estimation device and a charging time estimation method, which estimate the time required for charging a secondary cell. In particular, the present invention relates to a charging time estimation device and a charging time estimation method for a secondary cell that is charged by receiving a constant current charging and a constant voltage charging from a charger.

2. Background Art

Conventionally, in electric-powered vehicles such as electric vehicles or plug-in hybrid vehicles, Li-ion cell with large capacity is mounted as a drive battery. In general, Li-ion cell performs a constant current-constant voltage charging (CCCV charging) in which a constant current charging (CC charging) having a constant current value is performed when the cell voltage is low and a constant voltage charging (CV charging) having a constant voltage value is performed when the cell voltage is increased to a predetermined value.

For example, Japanese Patent No. 4946749 discloses a technique to prevent overcharge when charging a battery, using a configuration to include a charging rate detection means that detects the charging rate of the battery at the start of constant current control when a constant current-constant voltage charging is performed, an elapsed time measuring means that measures the elapsed time from the start of the constant current control, a time-out setting means that sets the time-out time of the constant current control based on the charging rate detected by the charging rate detection means and a current cut-off means that cuts off the current supplied to the battery when the elapsed time measured by the elapsed time measuring means exceeds the time-out time set by the time-out setting means in the constant current control.

When charging the battery (secondary cell) in the above-described electric-powered vehicles or the like, it takes time to finish the charging. Accordingly, it is intended to improve usability by estimating the time required for charging and displaying the estimated time. The value of current or voltage that is supplied to the secondary cell or the cell capacity (maximum cell capacity or remaining cell capacity) or the like is used to estimate the time required for charging. However, the current or voltage that is supplied during charging is varied depending on the magnitude, etc., of the internal resistance in the secondary cell and the value of the maximum cell capacity is reduced due to the cell deterioration or the like. Accordingly, the charging time estimation method according to the related art has a problem that the estimation accuracy of the charging time is lowered.

The present invention has been made in view of the above-described problems of the related art and an object thereof is to improve the estimation accuracy of the charging-required time for a secondary cell.

SUMMARY OF THE INVENTION (1) A charging time estimation device for estimating the time required for charging a secondary cell that is charged from a charger includes a cell temperature information acquisition unit that acquires cell temperature information of the secondary cell, a cell capacity information acquisition unit that acquires remaining cell capacity information of the secondary cell, a current value information acquisition unit that acquires current value information of charging current supplied to the secondary cell, a deterioration state information acquisition unit that acquires deterioration state information of maximum cell capacity of the secondary cell, a basic estimated value calculation unit that calculates a basic estimated value of the constant current charging time and a basic estimated value of the constant voltage charging time of the secondary cell by using the cell temperature information and the remaining cell capacity information, and a charging-required time calculation unit that performs correction on the basic estimated value of the constant current charging time and the basic estimated value of the constant voltage charging time by using the current value information and the deterioration state information, and calculates, as a charging-required time, the sum of the basic estimated value of the constant current charging time after the correction and the basic estimated value of the constant voltage charging time after the correction.

(2) In the configuration of (1), when the charger performs a constant power charging, instead of the constant current charging, the charging-required time calculation unit calculates a constant power charging time by using the basic estimated value of the constant current charging time after the correction and calculates, as the charging-required time, the sum of the constant power charging time and the basic estimated value of the constant voltage charging time after the correction.

(3) In the configuration of (2), the charging time estimation device further includes a voltage value information acquisition unit that acquires voltage value information of the secondary cell, and the charging-required time calculation unit calculates the constant power charging time by using start voltage value acquired by the voltage value information acquisition unit at the start of charging and transition voltage value from the constant power charging to the constant voltage charging.

(4) In the configuration of any one of (1) to (3), the charging-required time calculation unit performs the correction on the basic estimated value of the constant current charging time and the basic estimated value of the constant voltage charging time by multiplying the basic estimated value of the constant current charging time, a first coefficient and a second coefficient together, the first coefficient being obtained by dividing a reference value of charging current that is supplied from the charger to the secondary cell by the actual current value of charging current that is actually supplied to the secondary cell and the second coefficient being obtained by dividing the present value of the maximum cell capacity of the secondary cell by an initial value of the maximum cell capacity of the secondary cell.

According to the configuration of (1), since the basic estimated value of the constant current charging time and the basic estimated value of the constant voltage charging time are calculated by using the cell temperature information and the remaining cell capacity information and then corrected by using the current value information and the deterioration state information, it is possible to accurately estimate the charging-required time in consideration of the amount of current that is actually supplied to the secondary cell and the degree of deterioration of the secondary cell.

According to the configuration of (2), since, when the constant power charging is performed, the constant power charging time is calculated by using the basic estimated value of the constant current charging time after correction and the sum of the constant power charging time and the basic estimated value of the constant voltage charging time after correction is calculated as the charging-required time, it is possible to more accurately estimate the charging-required time in consideration of the conditions (power supplying conditions from the power supply) of the charger.

According to the configuration of (3), it is possible to estimate the constant power charging time based on the constant current charging time and also it is possible to estimate simply the charging-required time of the constant power charging in which the current and voltage are varied every moment.

According to the configuration of (4), the basic estimated values of the constant current charging time and constant voltage charging time are subjected to the correction by multiplying the basic estimated values of the constant current charging time, a first coefficient and a second coefficient together. Here, the first coefficient is obtained by dividing a reference value of charging current that is supplied from the charger to the secondary cell by the actual current value of charging current that is actually supplied to the secondary cell and the second coefficient is obtained by dividing the present value of the maximum cell capacity of the secondary cell by an initial value of the maximum cell capacity of the secondary cell. Accordingly, it is possible to calculate the charging-required time in consideration of the state of the secondary cell.

DESCRIPTION OF PREFERRED EMBODIMENT

Hereinafter, a charging time estimation device and a charging time estimation method according to preferred embodiments of the present invention will be described in detail with reference to the accompanying drawings.

Illustrative Embodiment

Figure 1:
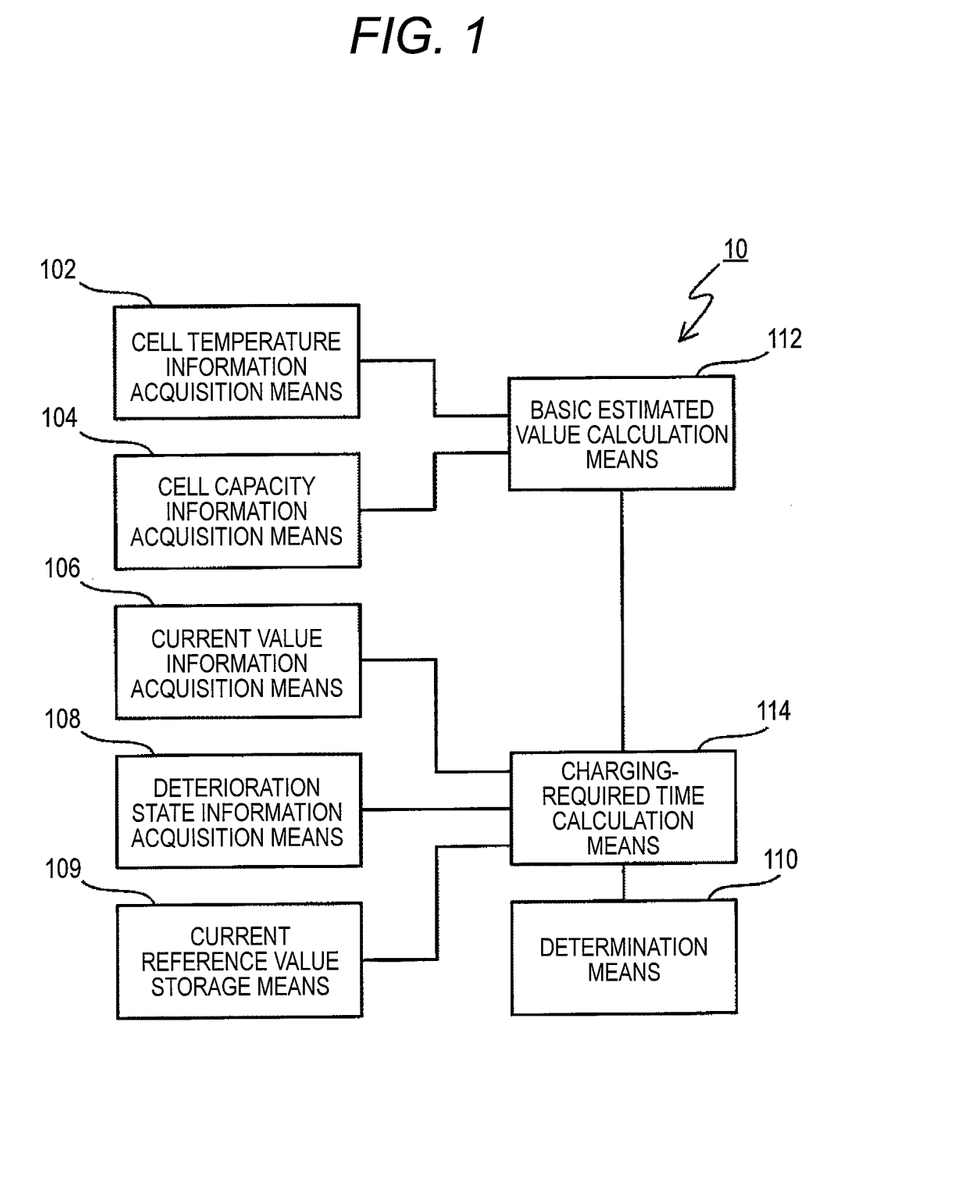
FIG. 1 is a block diagram showing a functional configuration of a charging time estimation device 10 according to an illustrative embodiment.
Figure 2A:
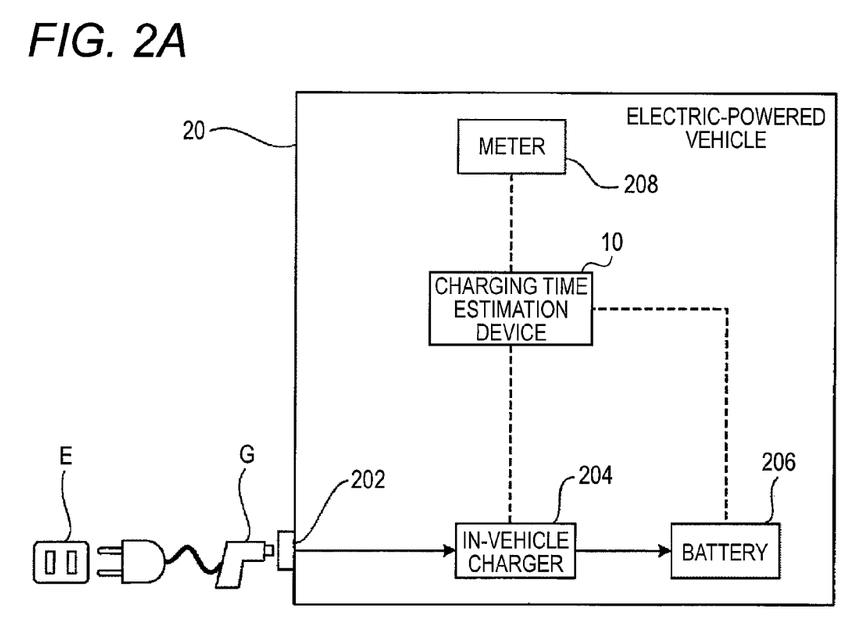
FIG. 2A and FIG. 2B are explanatory diagrams showing arrangement examples of the charging time estimation device 10.
Figure 2B:
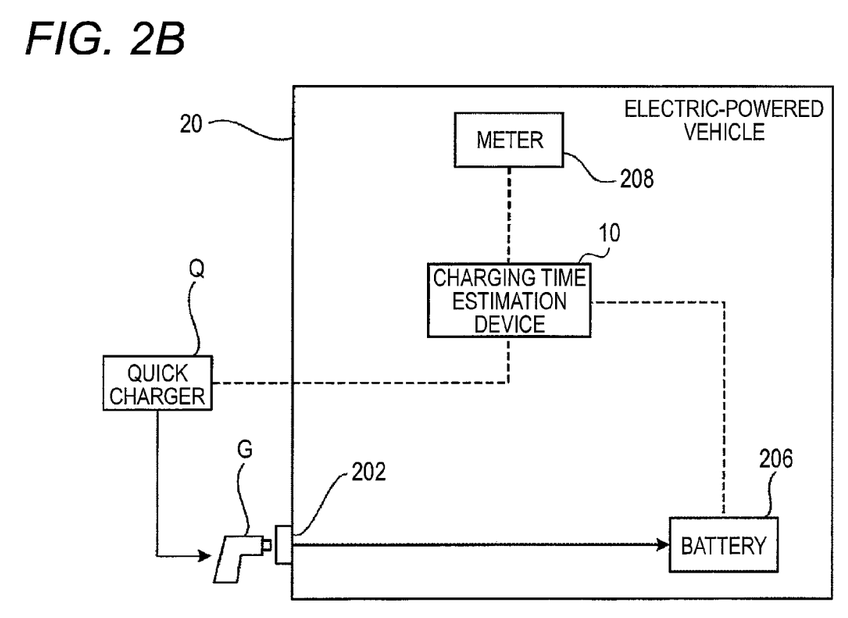

FIG. 1 is a block diagram showing a functional configuration of a charging time estimation device 10 according to an illustrative embodiment and FIG. 2A and FIG. 2B are explanatory diagrams showing arrangement examples of the charging time estimation device 10. The present embodiment describes the case of estimating the time required for charging a secondary cell (battery) mounted on an electric-powered vehicle by the charging time estimation device 10.

As shown in FIG. 2A and FIG. 2B, in the present embodiment, the charging time estimation device 10 is mounted in the electric-powered vehicle. FIG. 2A shows an arrangement example of the case of performing a normal charging using a household power supply and FIG. 2B shows an arrangement example of the case of performing a quick charging using a quick charger, respectively.

In the case of performing the normal charging (FIG. 2A), the charging is performed in such a way that a charging gun G supplied with external power from a household socket E is inserted into a charging port 202. The power supplied from the charging gun G is accumulated in a battery 206 through an in-vehicle charger 204. The charging time estimation device 10 estimates the time required for charging based on the information from the in-vehicle charger 204 and the battery 206 and causes the estimation results to be displayed on a meter 208.

In the case of performing the quick charging (FIG. 2B), the charging is performed in such a way that the charging gun G supplied with power from a quick charger Q for supplying a high voltage current is inserted into the charging port 202. The power supplied from the charging gun G is directly accumulated in the battery 206. The charging time estimation device 10 estimates the time required for charging based on the information from the quick charger Q and the battery 206 and causes the estimation results to be displayed on the meter 208. In this case, communication between the quick charger Q and the charging time estimation device 10 may be performed via a cable connected to the charging gun G, for example.

For example, the charging time estimation device 10 can be realized in such a way that CPU of EV-ECU executes a control program. The EV-ECU includes components such as CPU, ROM storing/memorizing the control program or the like, RAM as an operation region of the control program, EEPROM holding various data in a rewritable manner and an interface unit communicating with peripheral circuits or the like.

Further, in the present embodiment, both the normal charging and the quick charging are performed in a constant current-constant voltage charging (CCCV charging) in which a constant current charging (CC charging) having a constant current value is performed when the battery voltage is low and a constant voltage charging (CV charging) having a constant voltage value is performed when the battery voltage is increased to a predetermined value. However, in a case where the output from the charger is not sufficient to perform the constant current charging, it is assumed to perform a constant power charging (CP charging) in which the product of the current value (I) and the voltage value (V) at each time is constant, instead of the constant current charging.

Figure 3:
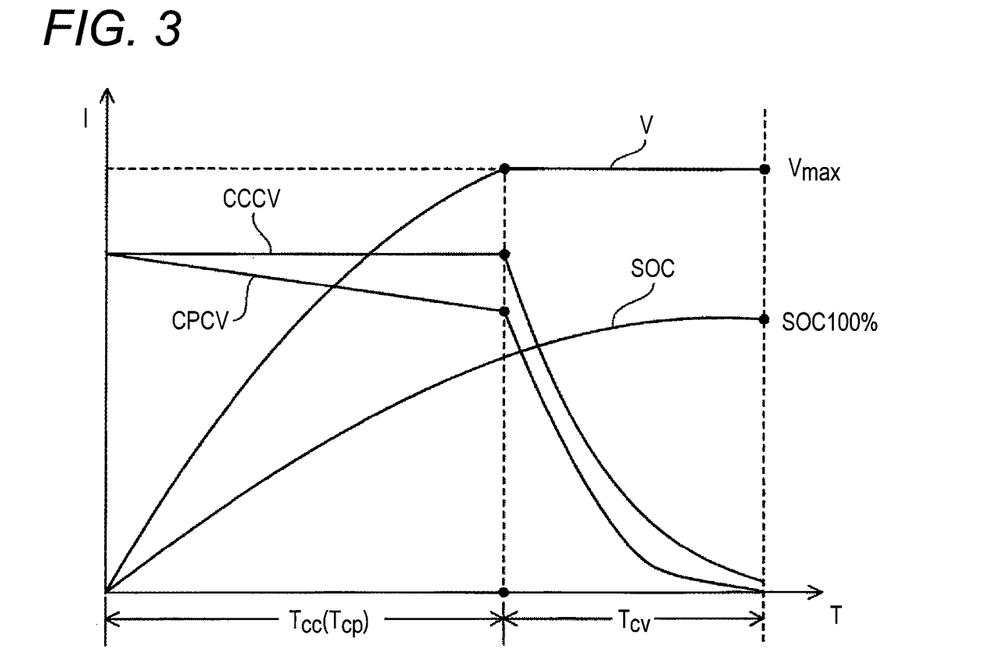
FIG. 3 is a graph for explaining a charging method of a battery 206.

FIG. 3 is a graph for explaining a charging method of the battery 206. In the graph shown in FIG. 3, a left vertical axis represents the current values I supplied to the battery 206, a right vertical axis represents SOC (State Of Charge) and voltage values of the battery 206 and a horizontal axis represents the time T. In addition, FIG. 3 represents the supply current values CCCV in the constant current-constant voltage charging, the supply current values CPCV in the constant power-constant voltage charging, the battery voltage V and the SOC information SOC of the battery 206. For the convenience of illustration, the constant current charging time $T_{CC}$ in the constant current-constant voltage charging, the constant power charging time $T_{CP}$ in the constant power-constant voltage charging, the constant voltage charging time $T_{CV}$ in the constant current-constant voltage charging and the constant voltage charging time $T_{CV}$ in the constant power-constant voltage charging are represented as being identical, respectively.

In the case of the constant current-constant voltage charging CCCV, the constant current charging is performed from the start of charging to a time point when the battery voltage reaches an upper limit voltage $V_{max}$. As shown in FIG. 3, the current value supplied to the battery 206 during the constant current charging is constant. The constant current charging is switched to the constant voltage charging when the battery voltage reaches the upper limit voltage $V_{max}$. The current value supplied to the battery 206 during the constant voltage charging is reduced in reverse proportional to the increase of the SOC. Further, the charging is terminated when the current value supplied to the battery 206 is almost zero (for example, a predetermined charging termination current value). In other words, the time from the start of charging to the time point when the battery voltage reaches the upper limit voltage $V_{max}$ is referred to as the constant current charging time $T_{CC}$ and the time from the time point when the battery voltage reaches the upper limit voltage $V_{max}$ to a time point when the current value supplied to the battery 206 becomes the charging termination current value is referred to as the constant voltage charging time $T_{CV}$.

Also in the case of the constant power-constant voltage charging CPCV, the constant power charging is performed from the start of charging to the time point when the battery voltage reaches the upper limit voltage $V_{max}$. However, as shown in FIG. 3, the current value supplied to the battery 206 during the constant power charging is not constant. The constant power charging is switched to the constant voltage charging when the battery voltage reaches the upper limit voltage $V_{max}$. Further, the charging is terminated when the current value supplied to the battery 206 is almost zero. In other words, the time from the start of charging to the time point when the battery voltage reaches the upper limit voltage $V_{max}$ is referred to as the constant power charging time $T_{CP}$ and the time from the time point when the battery voltage reaches the upper limit voltage $V_{max}$ to a time point when the current value supplied to the battery 206 becomes the charging termination current value is referred to as the constant voltage charging time $T_{CV}$.

As shown in FIG. 1, the charging time estimation device 10 is configured by a cell temperature information acquisition means 102, a cell capacity information acquisition means 104, a current value information acquisition means 106, a deterioration state information acquisition means 108, a current reference value storage means 109, a determination means 110, a basic estimated value calculation means 112 and a charging-required time calculation means 114.

The cell temperature information acquisition means 102 acquires the cell temperature information $t_{cell}$ of a secondary cell (battery 206). The cell temperature information acquisition means 102 acquires the cell temperature information $t_{ea}$ from BMU (Battery Management Unit; not shown) for controlling the state of the battery 206, for example. The cell temperature information $t_{cell}$ refers to an average value or the like of cell temperatures of each cell to configure the battery 206 that is a battery pack, for example.

The cell capacity information acquisition means 104 acquires the remaining cell capacity information SOC of the secondary cell (battery 206). Here, the remaining cell capacity information refers to SOC (State Of Charge) information, for example, and represents the ratio of presently available cell capacity to the total cell capacity of the battery 206. The remaining cell capacity information SOC can be estimated from a map which represents a relationship between the voltage of the battery 206 and the remaining cell capacity, for example. The cell capacity information acquisition means 104 acquires the remaining cell capacity information SOC from the BMU, for example.

The current value information acquisition means 106 acquires the current value information I of charging current supplied to the secondary cell (battery 206). The current value information acquisition means 106 acquires the current value information I from the in-vehicle charger 204 or the quick charger Q, for example. Although the amount of current supplied from the in-vehicle charger 204 or the quick charger Q is stored in the current reference value storage means 109 as an ideal value (a basic current value $I_{int}$ to be described later) (a reference value of charging current) in advance, the amount of current may be varied depending on the state of the power supply. The current value information acquisition means 106 acquires, as the current value information I, the information of the amount of current that is actually supplied from the in-vehicle charger 204 or the quick charger Q.

The deterioration state information acquisition means 108 acquires the deterioration state information of maximum cell capacity of the secondary cell (battery 206). Generally, the maximum cell capacity of the battery 206 is reduced as the charging and discharging are repeatedly carried out. The deterioration state information acquisition means 108 acquires the deterioration state information by acquiring the present maximum cell capacity P of the battery 206 from the BMU and comparing the maximum cell capacity of the battery 206 immediately after the start of use with an initial value (initial maximum cell capacity $P_{int}$ to be described later), for example.

The determination means 110 determines whether or not it is possible to perform the constant current charging of the secondary cell (battery 206). The determination means 110 determines whether or not it is possible to perform the constant current charging by determining whether the amount of current enough to allow the constant current charging is continuously obtained or not, with reference to the current value information I acquired by the current value information acquisition means 106, for example. Further, the determination means 110 may execute the above determination by acquiring the current value information directly from the in-vehicle charger 204 or the quick charger Q.

The basic estimated value calculation means 112 calculates the basic estimated value $T_{int}$ ($T_{int\_cc}$, $T_{int\_cv}$) of the constant current charging time $T_{CC}$ and the constant voltage charging time $T_{CV}$ for the secondary cell (battery 206) by using the cell temperature information $t_{cell}$ and the remaining cell capacity information SOC. The values obtained by correcting the basic estimated values $T_{int\_cc}$, $T_{int\_cv}$ by the charging-required time calculation means 114 (to be described later) correspond to the constant current charging time $T_{CC}$ and the constant voltage charging time $T_{CV}$.

Here, in the case of performing the constant current-constant voltage charging, the charging-required time $T_{CHG}$ of the battery 206 can be expressed by the following formula (1).

$$T_{CHG}=T_{CC}+T_{CV} \tag{1}$$

Further, in the case of performing the constant power-constant voltage charging, the charging-required time $T_{CHG}$ can be expressed by the following formula (2).

$$T_{CHG}=T_{CP}+T_{CV} \tag{2}$$

The basic estimated value calculation means 112 calculates the basic estimated value $T_{int\_cc}$ of the constant current charging time $T_{CC}$ and the basic estimated value $T_{int\_cv}$ of the constant voltage charging time $T_{CV}$ by using the cell temperature information $t_{cell}$ and the remaining cell capacity information SOC, respectively. As the method ($T_{int\_cc}$ ($t_{cell}$, SOC), $T_{int\_cv}$ ($t_{cell}$, SOC)) for calculating the basic estimated values $T_{int\_cc}$, $T_{int\_cv}$ using the cell temperature information $t_{cell}$ and the remaining cell capacity information SOC, various methods hitherto known can be applied.

The charging-required time calculation means 114 performs the correction on the basic estimated value $T_{int\_cc}$ of the constant current charging time $T_{CC}$ and the basic estimated value $T_{int\_cv}$ of the constant voltage charging time $T_{CV}$ by using the current value information and the deterioration state information and calculates, as the charging-required time $T_{CHG}$, the sum of the constant current charging time $T_{CC}$ and the constant voltage charging time $T_{CV}$.

The charging-required time calculation means 114 performs the correction on the basic estimated value $T_{int\_cc}$ of the constant current charging time $T_{CC}$ and the basic estimated value $T_{int\_cv}$ of the constant voltage charging time $T_{CV}$ by multiplying the basic estimated value, a first coefficient and a second coefficient together. Here, the first coefficient is obtained by dividing an ideal value (basic current value $I_{int}$) of charging current that is supplied to the secondary cell (battery 206) by the current value of charging current that is actually supplied to the secondary cell and the second coefficient is obtained by dividing the present value (present maximum cell capacity P) of the maximum cell capacity of the secondary cell (battery) by an initial value (initial maximum cell capacity $P_{ini}$) of the maximum cell capacity of the secondary cell. In other words, the charging-required time calculation means 114 performs the correction on the basic estimated value $T_{int\_cc}$ of the constant current charging time $T_{CC}$ and the basic estimated value $T_{int\_cc}$ of the constant voltage charging time $T_{CV}$ by the following formulas (3) and (4) and calculates the constant current charging time $T_{CC}$ and the constant voltage charging time $T_{CV}$.

$$T_{CC}=T_{int\_cc}(t_{cell},SOC) \times G_I \times G_{CAPA} \qquad (3)$$

$$T_{CV}=T_{int\_cv}(t_{cell},SOC) \times G_I G_{CAPA} \qquad (4)$$

(In Formula (3), (4), $$G_I = \frac{I_{int}}{I},$$

$$G_{CAPA} = \frac{P}{P_{ini}})$$

Here, the charging-required time $T_{CHG}$ is calculated by the formula (1)

Further, the charging-required time calculation means 114 calculates the constant power charging time $T_{CP}$ by using the constant current charging time $T_{CC}$ when it is determined by the determination means 110 that the constant current charging of the secondary cell (battery 206) is impossible. Specifically, the battery voltage at the start of charging (at the time of estimation of charging-required time) is defined as $V_1$ (start voltage value) and the transition voltage (upper limit voltage $V_{max}$ in FIG. 3) from the constant power charging to the constant voltage charging is defined as $V_2$ (transition voltage value). Here, the start voltage value $V_1$ and the transition voltage value $V_2$ are acquired by a voltage value information acquisition means (not shown) that acquires the voltage value information of the secondary cell. Since the product of current and voltage is constant in the constant power charging, the following formula (5) is established when the supply current at the start of charging is defined as $I_1$ and the supply current at the time of transition from the constant power charging to the constant voltage charging is defined as $I_2$.

$$V_1 \times I_1 = V_2 \times I_2 \qquad (5)$$

Further, in a case where the charging is performed under the same conditions, the amount of power that is charged until being shifted to the constant voltage charging is substantially equal, regardless of whether the constant power charging or the constant current charging is performed. Left expression of the following formula (6) represents that the amount of power that is charged until being shifted to the constant voltage charging can be calculated by time integration of the current value at each time.

$$\int_0^{T_{CC}} I_1 \, dt = \int_0^{T_{CP}} I(t) \, dt \Leftrightarrow T_{CC} \times I_1 = T_{CP} \times \frac{I_1 + I_2}{2} \qquad (6)$$

As described above, since the amount of power that is charged until being shifted to the constant voltage charging CV is substantially equal, regardless of whether the constant power charging or the constant current charging is performed, the relationship of the left expression of the formula (6) is established.

Figure 4:
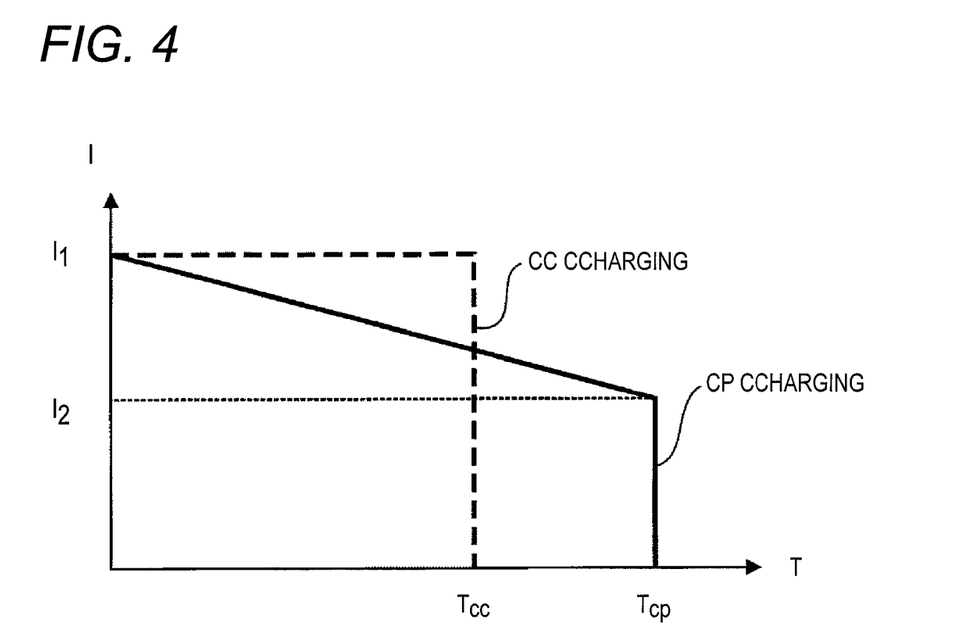
FIG. 4 is an explanatory diagram schematically showing the right expression of the formula (6).

FIG. 4 is an explanatory diagram schematically showing the right expression of the formula (6). In the graph shown in FIG. 5, a vertical axis represents the current and a horizontal axis represents the time. The time $T_{CC}$ represents the transition time (i.e., constant current charging time) from the constant current charging to the constant voltage charging CV in the case of performing the constant current charging CC. Further, the time $T_{CP}$ represents the transition time (i.e., constant power charging time) from the constant power charging to the constant voltage charging CV in the case of performing the constant power charging CC. The current value is constant at any time in the case of the constant current charging CC and therefore the amount of power that is charged from the start of charging to the time $T_{CC}$ can be calculated as $T_{CC} \times I_1$ (the area of the rectangle). On the other hand, the current value varies depending on the time in the case of the constant power charging CP. When the variation in the current value is approximated to a straight line, the amount of power that is charged from the start of charging to the time $T_{CP}$ can be calculated as the area of the trapezoid in which the supply current $I_1$ at the start of the charging is considered as an upper base, the supply current $I_2$ at the time of transition from the constant power charging CP to the constant voltage charging CV is considered as a lower base and the time $T_{CP}$ is considered as a height. As described above, since, in a case where the charging is performed under the same conditions, the amount of power that is charged until being shifted to the constant voltage charging CV is substantially equal, regardless of whether the constant power charging CP or the constant current charging CC is performed, the area of the rectangle of the constant current charging CC and the area of the trapezoid of the constant power charging CP are equal to each other. The right expression of the formula (6) represents the relationship as described above.

From the formulas (5) and (6), the constant power charging time $T_{CP}$ can be calculated by the following formula (7) using the constant current charging time $T_{CC}$.

$$T_{CP} = T_{CC} \times \frac{2 \times V_2}{V_1 + V_2} \qquad (7)$$

Figure 5:
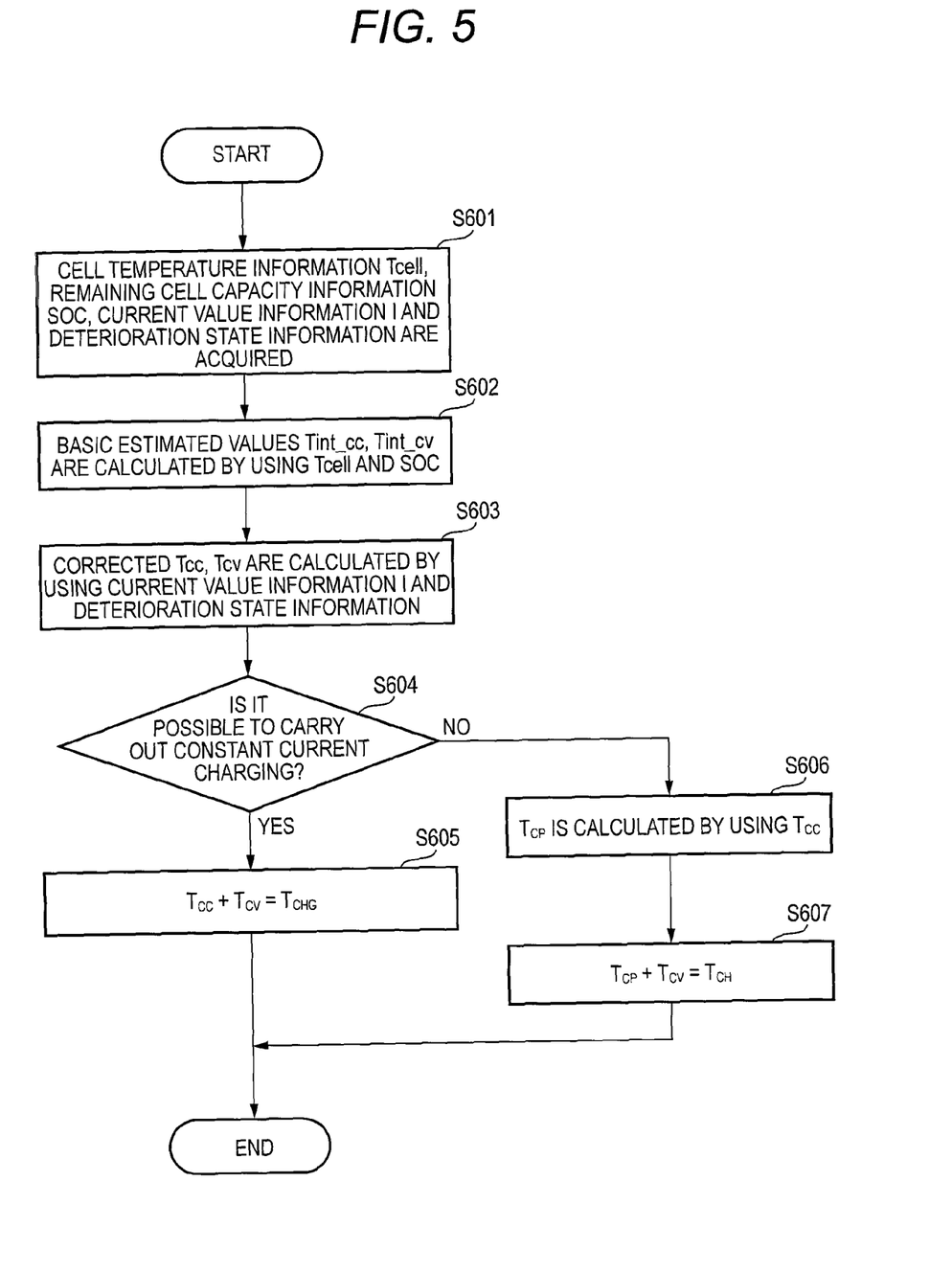
FIG. 5 is a flowchart showing a procedure of a charging time estimation process by the charging time estimation device 10.

FIG. 5 is a flowchart showing a procedure of a charging time estimation process by the charging time estimation device 10. The estimation process shown in FIG. 5 is performed immediately after the charging gun G is inserted into an electric-powered vehicle 20 (see FIG. 2), for example, and then the charging of the battery 206 is started. Further, the estimation accuracy can be improved by performing the estimation process shown in FIG. 5 at any time during charging.

Referring to the flowchart shown in FIG. 5, in the charging time estimation device 10, first, the cell temperature information acquisition means 102, the cell capacity information acquisition means 104, the current value information acquisition means 106 and the deterioration state information acquisition means 108, respectively, acquire the cell temperature information $t_{cell}$ the remaining cell capacity information SOC, the current value information I of charging current and the deterioration state information in the battery 206 (Step S601). Then, in the charging time estimation device 10, the basic estimated value calculation means 112 calculates the basic estimated value $T_{int\_c}$, of the constant current charging time $T_{CC}$ and the basic estimated value $T_{int\_cv}$ of the constant voltage charging time $T_{CV}$ by using the cell temperature information $t_{cell}$ and the remaining cell capacity information SOC (Step S602).

Subsequently, in the charging time estimation device 10, the charging-required time calculation means 114 performs the correction on the basic estimated value $T_{int\_cc}$ of the constant current charging time $T_{CC}$ and the basic estimated value $T_{int\_cv}$ of the constant voltage charging time $T_{CV}$ by using the current value information I and the deterioration state information and calculates the constant current charging time $T_{CC}$ and the constant voltage charging time $T_{CV}$ (Step S603). Specifically, the correction is performed by multiplying a coefficient to the basic estimated values, as represented by the formulas (3) and (4).

Subsequently, in the charging time estimation device 10, the determination means 110 determines whether or not it is possible to perform the constant current charging of the battery 206 (Step S604). When it is determined that it is possible to perform the constant current charging CC (Yes in Step S604), the charging-required time calculation means 114 calculates, as the charging-required time $T_{CHG}$, the sum of the constant current charging time $T_{CC}$ and the constant voltage charging time $T_{CV}$ (Step S605) and the process by the present flowchart is ended.

On the other hand, when it is determined that it is impossible to perform the constant current charging CC (No in Step S604), i.e., when the constant power charging CP is performed, the charging-required time calculation means 114 calculates the constant power charging time $T_{CP}$ (Step S606). Specifically, by performing the calculation of the formulas (5) to (7), the constant power charging time $T_{CP}$ is calculated by using the constant current charging time $T_{CC}$ calculated in the Step S603. Then, the sum of the constant power charging time $T_{CP}$ and the constant voltage charging time Tcv is calculated as the charging-required time $T_{CHG}$ (Step S607) and the process by the present flowchart is ended. The charging-required time $T_{CHG}$ calculated in the Step S605 or Step S607 is displayed on the meter 208 or the like (see FIG. 2).

As described above, since, in the charging time estimation device 10 according to the present embodiment, the basic estimated value $T_{int\_cc}$ of the constant current charging time $T_{CC}$ and the basic estimated value $T_{int\_cv}$ of the constant voltage charging time $T_{CV}$ are calculated by using the cell temperature information $t_{cell}$ and the remaining cell capacity information SOC and then corrected by using the current value information I and the deterioration state information, it is possible to more accurately estimate the charging-required time in consideration of the amount of current that is actually supplied to the battery 206 and the degree of deterioration of the battery 206.

Further, since, in the charging time estimation device 10, the constant power charging time $T_{CP}$ is calculated by using the constant current charging time $T_{CC}$ after correction when it is determined that it is impossible to perform the constant current charging of the battery 206 and the sum of the constant power charging time $T_{CP}$ and the constant voltage charging time $T_{CV}$ is calculated as the charging-required time $T_{CHG}$, it is possible to more accurately estimate the charging-required time in consideration of the conditions (power supplying conditions from the power supply) of the charger.

Further, in the charging time estimation device 10, it is possible to estimate the constant power charging time $T_{CP}$ based on the constant current charging time $T_{CC}$ and it is possible to estimate simply the charging-required time of the constant power charging in which the current and voltage are varied every moment. Furthermore, in the charging time estimation device 10, the basic estimated values of the constant current charging time $T_{CC}$ and constant voltage charging time $T_{CV}$ are corrected by multiplying a first coefficient and a second coefficient together. Here, the first coefficient is obtained by dividing an ideal value (basic current value $I_{int}$) of charging current that is supplied to the battery 206 by the current value of charging current that is actually supplied to the battery 206 and the second coefficient is obtained by dividing the present maximum cell capacity of the battery 206 by an initial value of the maximum cell capacity. Accordingly, it is possible to calculate the charging-required time in consideration of the state of the battery 206.

What is claimed is:

1. A charging time estimation device for estimating the time required for charging a secondary cell that is charged from a charger, the charging time estimation device comprising:
    a cell temperature information acquisition unit that acquires cell temperature information of the secondary cell;
    a cell capacity information acquisition unit that acquires remaining cell capacity information of the secondary cell;
    a current value information acquisition unit that acquires current value information of charging current supplied to the secondary cell;
    a deterioration state information acquisition unit that acquires deterioration state information of maximum cell capacity of the secondary cell;
    a basic estimated value calculation unit that calculates a basic estimated value of the constant current charging time and a basic estimated value of the constant voltage charging time of the secondary cell by using the cell temperature information and the remaining cell capacity information; and
    a charging-required time calculation unit that performs correction on the basic estimated value of the constant current charging time and the basic estimated value of the constant voltage charging time by using the current value information and the deterioration state information, and calculates, as a charging-required time, the sum of the basic estimated value of the constant current charging time after the correction and the basic estimated value of the constant voltage charging time after the correction.

2. The charging time estimation device according to claim 1, wherein, when the charger performs a constant power charging, instead of the constant current charging, the charging-required time calculation unit calculates a constant power charging time by using the basic estimated value of the constant current charging time after the correction and calculates, as the charging-required time, the sum of the constant power charging time and the basic estimated value of the constant voltage charging time after the correction.

3. The charging time estimation device according to claim 2, further comprising a voltage value information acquisition unit that acquires voltage value information of the secondary cell,
wherein the charging-required time calculation unit calculates the constant power charging time by using start voltage value acquired by the voltage value information acquisition unit at the start of charging and transition voltage value from the constant power charging to the constant voltage charging.

4. The charging time estimation device according to claim 1, wherein the charging-required time calculation unit performs the correction on the basic estimated value of the constant current charging time and the basic estimated value of the constant voltage charging time by multiplying the basic estimated value of the constant current charging time, a first coefficient and a second coefficient together, the first coefficient being obtained by dividing a reference value of charging current that is supplied from the charger to the secondary cell by the actual current value of charging current that is actually supplied to the secondary cell and the second coefficient being obtained by dividing the present value of the maximum cell capacity of the secondary cell by an initial value of the maximum cell capacity of the secondary cell.

5. The charging time estimation device according to claim 2, wherein the charging-required time calculation unit performs the correction on the basic estimated value of the constant current charging time and the basic estimated value of the constant voltage charging time by multiplying the basic estimated value of the constant current charging time, a first coefficient and a second coefficient together, the first coefficient being obtained by dividing a reference value of charging current that is supplied from the charger to the secondary cell by the actual current value of charging current that is actually supplied to the secondary cell and the second coefficient being obtained by dividing the present value of the maximum cell capacity of the secondary cell by an initial value of the maximum cell capacity of the secondary cell.

6. The charging time estimation device according to claim 3, wherein the charging-required time calculation unit performs the correction on the basic estimated value of the constant current charging time and the basic estimated value of the constant voltage charging time by multiplying the basic estimated value of the constant current charging time, a first coefficient and a second coefficient together, the first coefficient being obtained by dividing a reference value of charging current that is supplied from the charger to the secondary cell by the actual current value of charging current that is actually supplied to the secondary cell and the second coefficient being obtained by dividing the present value of the maximum cell capacity of the secondary cell by an initial value of the maximum cell capacity of the secondary cell.

* * * * *